United States Patent [19]
Burgess

[11] 3,772,815
[45] Nov. 20, 1973

[54] FISH LURE RETRIEVER

[76] Inventor: Fred L. Burgess, Castle City Mobile Park, Newcastle, Calif. 95658

[22] Filed: Mar. 3, 1972

[21] Appl. No.: 231,540

[52] U.S. Cl. .............................................. 43/17.2
[51] Int. Cl. ........................................... A01k 97/00
[58] Field of Search ...................... 43/17.2, 5, 44.97

[56] References Cited
UNITED STATES PATENTS

| | | | |
|---|---|---|---|
| 3,688,429 | 9/1972 | Mauck | 43/17.2 |
| 3,464,138 | 9/1969 | Lindner | 43/17.2 |
| 3,550,303 | 12/1970 | Western | 43/17.2 |
| 3,176,425 | 4/1965 | Mudd | 43/17.2 |
| 3,364,611 | 1/1968 | Downing | 43/17.2 |
| 3,401,483 | 9/1968 | Bellah et al. | 43/42.39 |
| 3,693,277 | 9/1972 | Wells | 43/17.2 |

Primary Examiner—Louis G. Mancene
Assistant Examiner—James H. Czerwonky
Attorney—Alexander B. Blair

[57] ABSTRACT

The fish lure retriever of the present invention includes a weighted body having a large central aperture opened on one side by a narrow slot. The body is connected to a heavy cord and permitted to slide down a fish line having a snagged lure on its lower end. Slotted weights are detachably connected to the lower end of the retriever, the slots opening into the aperture to engage the fish line. The body has a plurality of grapple hooks loosely secured to its lower end and adapted to grapple with the object on which the lure is snagged so that the object can be lifted to the surface along with the lure snagged thereon, or if the object is too heavy to pull the lure therefrom.

1 Claim, 4 Drawing Figures

PATENTED NOV 20 1973 3,772,815

FISH LURE RETRIEVER

BACKGROUND OF THE INVENTION

1. Field of the Invention

The present invention relates to fish lure retrievers for retrieving snagged lures.

2. Summary of the Invention

The retriever includes a weighted body having a central aperture opening through one side by means of a slot. The lower end of the retriever body is provided with a plurality of loosely connected grapple hooks so as to grapple with an object on which the fish lure is snagged so that the fish lure can be raised to the surface.

The primary object of the invention is to provide a fish lure retriever which lifts the object on which the fish lure is snagged to permit the fish lure to be disconnected therefrom.

Other objects and advantages will become apparent in the following specification when considered in the light of the attached drawings.

DESCRIPTION OF THE PREFERRED EMBODIMENTS

Figure 1:
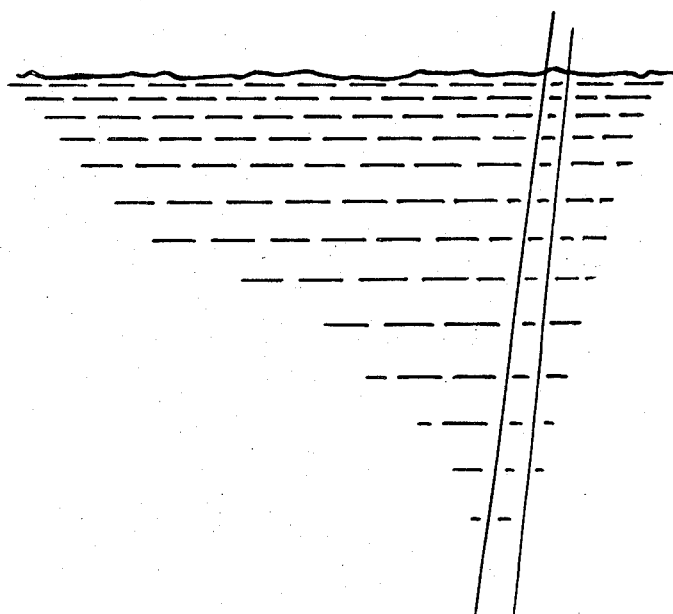
FIG. 1 is a side elevation of the invention.

Referring now to the drawings in detail wherein like reference characters indicate like parts throughout the several figures the reference numeral 10 indicates generally a fish lure retriever constructed in accordance with the invention.

The retriever 10 is adapted for use with a fish line 11 having a lure 12 secured to the lower end thereof and as illustrated in FIG. 1 snagged on an object 13 lying on the bottom 14 of the body of water being fished.

The retriever 10 includes a generally flat body 15 having a central aperture 16 formed therein. A slot 17 extends through one side of the body 15 communicating with the aperture 16 to permit the fish line 11 to be maneuvered into the aperture 16. A pair of weights 18, 19 are secured on opposite sides of the lower end of the body 15 by means of a pair of bolts 20.

Figure 2:
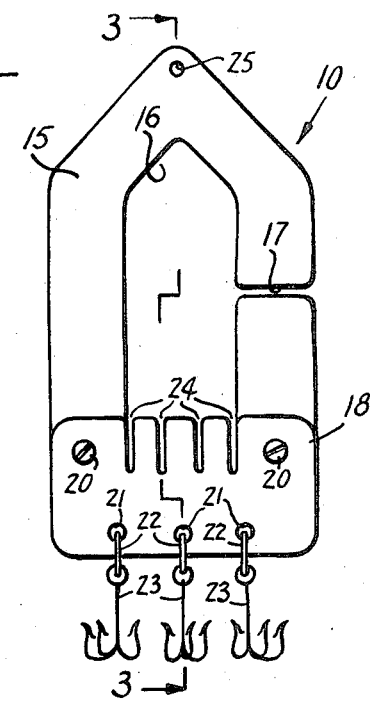
FIG. 2 is a front view of the retriever.
Figures 3, 4:
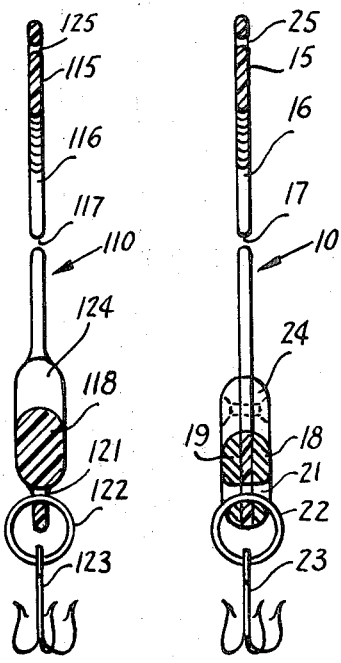
FIG. 3 is a vertical sectional view taken along the line 3—3 of FIG. 2 looking in the direction of the arrows.
FIG. 4 is a view similar to FIG. 3 of a modified form of the invention.

A plurality of bores 21 extend through the weights 18, 19 and the lower end of the body 15 to receive attaching rings 22. Grapple hooks 23 are secured to the rings 22 and dangle below the body 15 as illustrated in FIGS. 2 and 3. A plurality of slots 24 are formed in the weights 18, 19 at the lower end of the aperture 16 to engage with the fish line 11 as the retriever 10 is being drawn back into the boat. A bore 25 is formed in the upper end of the body 15 to permit a heavy duty handling cord 26 to be attached thereto.

A modified lure retriever is illustrated generally at 110 in FIG. 4 and includes a generally flat body 115 having an aperture 116 formed therein with a slot 117 opening through one side thereof. The retriever 110 has a thickened weighted portion 118 at its lower end portion corresponding to the weights 18, 19 and has a plurality of transverse bores 121 extending therethrough to receive rings 122 connecting grapple hooks 123 to the body 115. Line receiving slots 124 are formed in the lower end of the aperture 116 and a bore 125 is formed in the upper end of the body 115 for attaching the cord 26.

In the use and operation of the invention illustrated in FIGS. 1 through 4 the retriever body 15 has the fish line 11 passed through the slot 17 into the aperture 16. The body 15 is then lowered carefully with the cord 26 until the grapple hooks 23 contact and grapple with the object 13 on which the lure 12 is snagged. When the grapple hooks 23 have caught on the object 13 the cord 26 is then pulled to free the lure from the object or raise the object 13 to the surface so that the lure 12 can be disconnected therefrom. The fish line 11 engages in one of the slots 24 as the retriever 10 is being raised.

The retriever 110 is used in the identical manner described above as the retriever 10.

Having thus described the preferred embodiments of the invention it should be understood that numerous structural modifications and adaptations may be resorted to without deparing from the spirit of the invention.

I claim:

1. A fish line retriever comprising a generally flat body having a central aperture therein, a slot opening through one side of said body permitting a fish line to be passed into said aperture, a cord secured to the upper end of said body, weights detachably secured to opposite faces of the lower end of said body, a plurality of spaced parallel slots formed in said weights and opening into said aperture for engaging the fish line when returning the retriever to the surface of the water, a plurality of rings loosely engaged in individual bores in the lower end of said body and said weights, and a grapple hook loosely mounted on each of said rings for grappling and raising an object on which a lure is snagged.

* * * * *